UNITED STATES PATENT OFFICE.

EDWIN EUSTON, OF ST. LOUIS, MISSOURI.

PROCESS OF PRODUCING WHITE LEAD.

1,075,143.                    Specification of Letters Patent.         Patented Oct. 7, 1913.

No Drawing.              Application filed April 28, 1913.    Serial No. 764,057.

*To all whom it may concern:*

Be it known that I, EDWIN EUSTON, a citizen of the United States, residing at city of St. Louis, State of Missouri, have invented a certain new and useful Improvement in Processes of Producing White Lead, of which the following is a full, clear, and exact description, such as will enable others skilled in the art to which it appertains to make and use the same.

My invention relates to a process of producing white lead, my object being to provide a new and easily practised method whereby white lead of the best quality can be easily, cheaply, and rapidly produced.

I have discovered that by separately preparing and subsequently mixing together the relatively bulky basic carbonate of lead precipitated by carbon dioxid gas from a lead acetate solution, maintained alkaline, and the relatively dense more highly carbonated precipitate obtained by continuing the action of carbon dioxid gas on lead acetate solution until of acid reaction to litmus, a pigment is obtained having opacity, whiteness, spreading and brushing qualities in every way equal to the best known commercial grades of white lead.

One simple and practical way of practising my improved process is the preparation, in any of the well known ways, of a solution of basic lead acetate of preferably 20 degrees Baumé (neutral point 10 degrees Baumé) and spraying said solution through an atmosphere of either dilute or strong carbon dioxid gas in a suitable vessel by a circulating pump until most, but not all, of the basic lead acetate is precipitated, the solution still remaining alkaline and the precipitate containing less than 11.3 per cent. carbon dioxid in combination. A second and similar solution of basic lead acetate is then prepared and similarly treated with carbon dioxid gas with the exception that the process is continued until all of the basic acetate of lead is precipitated and the solution tests acid to litmus, the precipitate containing more than 11.3 per cent. carbon dioxid in combination.

The two above described steps may be practised in separate apparatus or alternately in one apparatus and the two products may be directly mixed upon discharge from said apparatus and the so-mixed precipitates removed together from the solution by settling or other known means in preparation for the market; or the two products may be separately settled and the two precipitates so freed from the solutions may then be mixed either before or after drying or before or after mixing with linseed oil in preparation for the market.

The strength of solution, the strength of carbon dioxid gas, the pressure of the carbon dioxid gas, the temperature and the form of apparatus may be varied and are not essential to the basic idea of my invention which consists in, first, the separate formation of two pigments precipitated from lead acetate solutions as described, one of which pigments contains less than 11.3 per cent. carbon dioxid and the other containing more than 11.3 per cent. carbon dioxid, and second, the mixing of said two pigments together in proportions to produce a pigment containing approximately from 11.3 per cent. to 14.5 per cent. carbon dioxid as desired.

Having thus described my invention, what I claim is:

1. The hereindescribed process of producing white lead consisting in the admixture of precipitated basic lead carbonate containing less than 11.3 per cent. carbon dioxid with precipitated basic lead carbonate containing more than 11.3 per cent. carbon dioxid in proportions to form a pigment containing approximately 11.3 per cent. to 14.5 per cent. carbon dioxid.

2. The process of manufacturing white lead, consisting first, in precipitating, by carbon dioxid gas from basic lead acetate solution, maintained alkaline, basic carbonate of lead containing less than 11.3 per cent. carbon dioxid, second, in separately precipitating, by carbon dioxid gas from a basic lead acetate solution, eventually acid, carbonate of lead containing more than 11.3 per cent. carbon dioxid, and third, in mixing the said two products, in proportions to form a pigment containing 11.3 per cent. to 14.5 per cent. carbon dioxid.

3. The process of manufacturing white lead consisting, first in precipitating basic carbonate of lead by carbon dioxid gas from basic lead acetate solution, maintained alkaline, second, separately forming a precipitate by carbon dioxid gas from basic lead acetate solution, eventually acid, and third, mixing the two products thus obtained in proportions to form a pigment containing 11.3% to 14.5% carbon dioxid.

In testimony whereof I hereunto affix my signature in the presence of two witnesses, this 26th day of April, 1913.

EDWIN EUSTON.

Witnesses:
M. P. SMITH,
JESSIE CLARK.